United States Patent [19]

Seiter

[11] Patent Number: 5,078,432
[45] Date of Patent: Jan. 7, 1992

[54] MULTIPLE DUCT CONDUIT AND COUPLINGS

[75] Inventor: David A. Seiter, Marietta, Ga.
[73] Assignee: The George Ingraham Corporation, Stone Mountain, Ga.
[21] Appl. No.: 831,832
[22] Filed: Feb. 24, 1986

Related U.S. Application Data

[63] Continuation-in-part of Ser. No. 802,697, Nov. 27, 1985.

[51] Int. Cl.$^5$ .............................................. F16L 39/00
[52] U.S. Cl. .................................. 285/137.1; 285/331; 285/345; 285/371; 285/383
[58] Field of Search .................... 285/137.1, 331, 345, 285/369, 383, 371

[56] References Cited

U.S. PATENT DOCUMENTS

| | | | |
|---|---|---|---|
| 268,031 | 11/1882 | Linford . | |
| 273,305 | 3/1883 | Plankinton . | |
| 528,291 | 10/1894 | Cummings | 285/137.1 X |
| 680,151 | 8/1901 | Hultman | 285/369 X |
| 2,696,835 | 12/1954 | Kaiser | 285/137.1 X |
| 3,042,427 | 7/1962 | Word, Jr. | 285/137.1 |
| 3,125,361 | 3/1964 | Weaver | 285/137.1 |
| 3,574,356 | 4/1971 | Salerno | 285/137.1 X |
| 3,590,855 | 7/1971 | Woollen | 285/137.1 X |
| 3,747,632 | 7/1973 | Kok et al. | 285/137.1 X |
| 4,341,392 | 7/1982 | van Dongeren | 285/345 X |

FOREIGN PATENT DOCUMENTS 2845926 4/1980 Fed. Rep. of Germany ... 285/137.1

Primary Examiner—Richard J. Scanlan, Jr.
Attorney, Agent, or Firm—Thomas, Kerr & Kayden

[57] ABSTRACT

The conduit sections of a multiple duct conduit system each include a coupling assembly 15 mounted at one end of each conduit section 10, with the coupling assembly including an outer cylindrical coupling 24 and an inner coupling 25. The inner coupling includes an inner receptacle 45 having a support plate 40 with sockets 44 and 45 mounted to both sides of the support plate in alignment with openings in the support plate. O-rings 55 are seated in annular grooves 54 of the passageways formed by the sockets, and internal flanges 48 project inwardly of each passageway. When the conduit sections are connected in end-to-end relationship, the protruding inner ducts 12 of one conduit section 10B are moved into the coupling assembly 15 until the inner ducts 12B are moved into the inner coupling assembly 25, whereupon the relatively small openings 45 of the O-rings 55 are stretched so as to permit passage therethrough of the inner ducts 12. This forms a seal about the inner ducts.

15 Claims, 3 Drawing Sheets

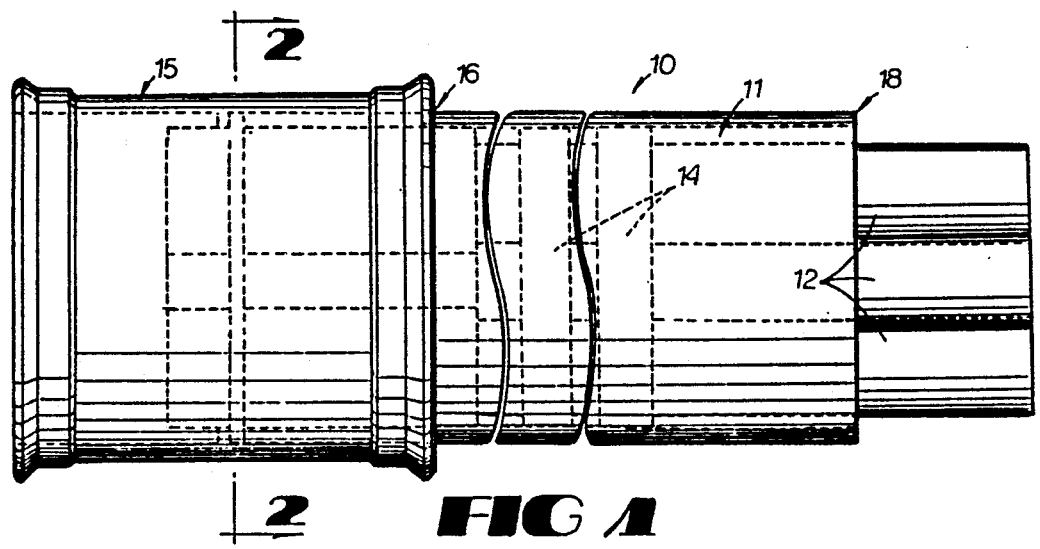
FIG 1
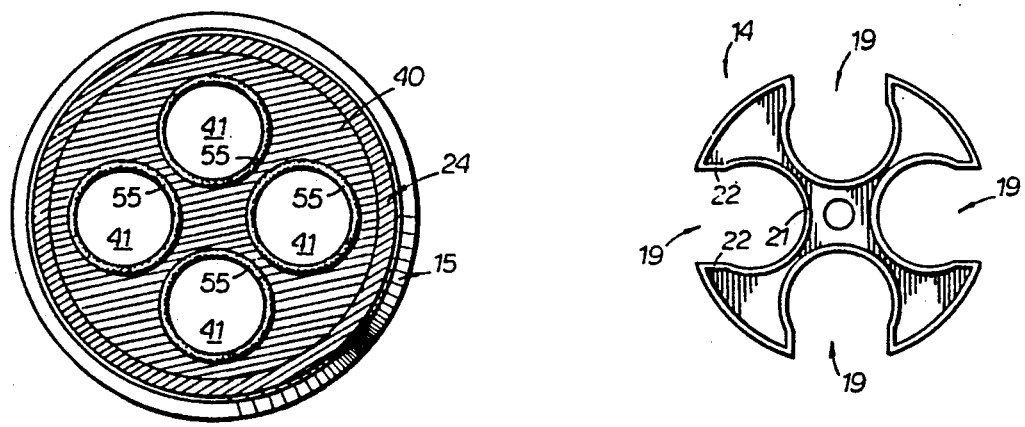
FIG 2
FIG 3
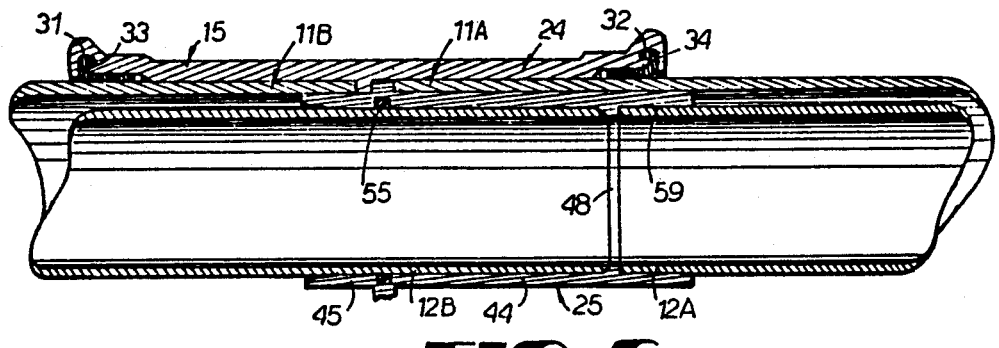
FIG 6

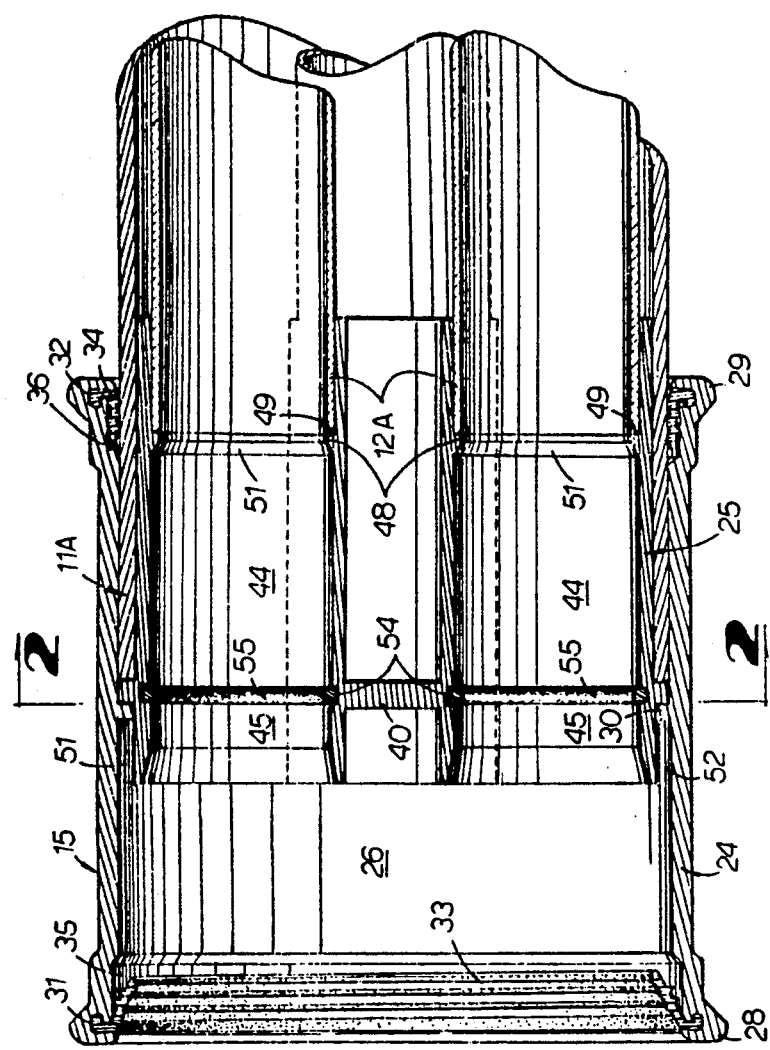
FIG 4
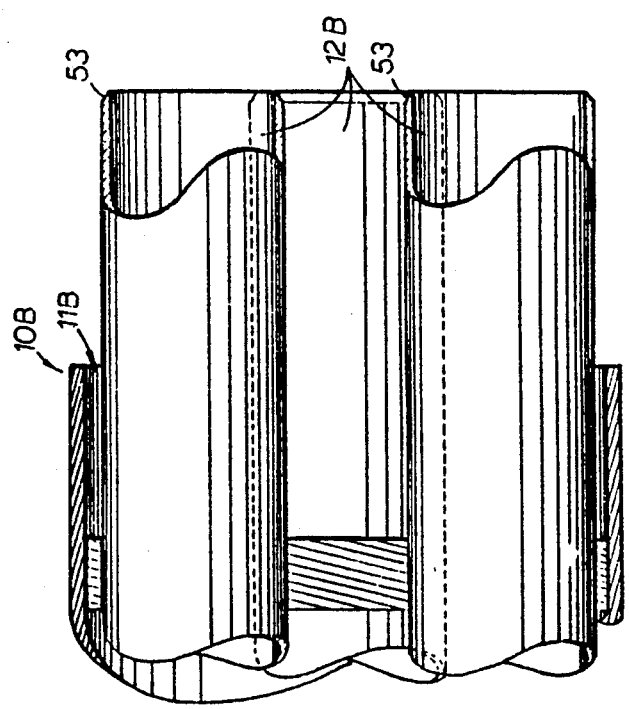

MULTIPLE DUCT CONDUIT AND COUPLINGS

CROSS REFERENCE

This is a continuation in part of U.S. patent application Ser. No. 802,697 filed Nov. 27, 1985.

FIELD OF THE INVENTION

Multiple duct conduit systems of the type suitable for underground light guide cable installations usually include a plurality of conduit sections connected together in end-to-end relationship with the sections each including an outer duct and a plurality of inner ducts within the outer duct. Each conduit section has a coupling at one end thereof which sealingly connects to the end of an adjacent conduit section and which connects the inner ducts as well as the outer ducts of adjacent conduit sections.

BACKGROUND OF THE INVENTION

When light guide cables are used for telephone transmission, it is desirable in many instances to have the cables installed underground. Typically, the light guide cables are threaded through multiple duct conduit sections that are assembled at the job site, by connecting the conduit sections in end-to-end relationship at a level of about three or more feet underground to form a continuous conduit system. The conduit system extends from one manhole to another manhole, and the light guide cable is pulled through the inner ducts of the conduit system after the conduit system has been installed.

Typically, a plug or foam carrier is inserted into one end of one of the inner ducts of the conduit system, a pulling tape is attached to the plug, and the plug is propelled through the inner duct with compressed air, pulling the tape behind it. After the pulling tape has been threaded through a conduit system from one manhole to the next manhole, one end of the light guide cable is attached to the pulling tape and the cable is then pulled through the duct with the pulling tape.

It is more economical to have the conduit system extend for long distances between manholes so as to reduce the number of manholes necessary for a conduit system, and also to avoid the number of steps required in pulling the light guide cable from one destination to another.

In order to propel the plug that carries the pulling tape through the inner ducts of the conduit system, it is necessary that the inner duct segments be substantially sealed together so as to avoid the loss of air pressure as the air pushed the plug through the ducts. Moreover, it is desirable that the conduit segments be constructed so that they are easy to connect together and do not require extensive application of adhesives, tapes and other sealing and connecting devices.

SUMMARY OF THE INVENTION

Briefly described, the present invention comprises a multiple duct conduit system suitable for underground light guide cable installations, with each conduit section including a coupling assembly arranged to seal together the outer and inner ducts of adjacent conduit sections. Each conduit section includes an outer duct and a plurality of inner ducts positioned parallel to one another within the outer duct, and a coupling assembly mounted to one common end of the outer and inner ducts. The coupling assembly includes an outer cylindrical coupling for receiving the adjacent ends of the outer ducts of the adjacent conduit sections and a receptacle mounted inside the outer cylindrical coupling for receiving the inner ducts of the adjacent conduit sections. The receptacle includes a support plate defining a plurality of duct openings therethrough, and a plurality of cylindrical sockets mounted to the support plate with each socket aligned with a duct opening. Each socket includes an O-ring seal seated therein in an internal annular groove.

With this arrangement, when the outer and inner conduits of one conduit section are plugged into the coupling of an adjacent conduit section, the inner conduits of the one conduit section move into the sockets of the receptacle and force themselves through the smaller openings formed by the O-ring seals, thereby compressing the O-ring seals outwardly to a larger diameter and tending to form a seal about the outer surfaces of the inner ducts. This tends to seal the inner ducts together in end-to-end relationship so as to avoid loss of air pressure when the plug is moved with pressurized air through the conduit system to pull the pulling tape therethrough. In the meantime, the same plugging action results in the outer duct moving into the outer cylindrical coupling, and an annular flexible seal mounted to and extending inwardly of the outer coupling seals about the outer duct.

Thus, it is an object of this invention to provide a multiple duct conduit system suitable for underground light guide cable installations, with the conduit system being formed with a plurality of similar elongated conduit sections placed in end-to-end connection, whereby the conduit sections are easily connected together, and once connected together, the inner ducts are substantially pneumatically sealed in aligned end-to-end relationship.

Another object of this invention is to provide a multiple duct conduit system having a coupling assembly at one end of each of a plurality of conduit sections, with the coupling assembly being inexpensive to produce, expedient to connect to adjacent conduit sections, and with the coupling assembly substantially sealing the inner ducts of the conduit system together and firmly supporting the inner ducts in end-to-end relationship.

Another object of this invention is to provide an inexpensive and reliable coupling assembly in combination with a conduit section of a multiple duct conduit system in which the conduit sections are connected end-to-end, with the coupling assembly being easy to handle by the workers at a construction site and which forms a reliable seal between the inner ducts of the multiple duct conduit system.

Other objects, features and advantages of this invention will become apparent upon reading the following specification, when taken in conjunction with the accompanying drawings.

BRIEF DESCRIPTION OF THE DRAWINGS

FIG. 1 is a side view of a conduit section, with portions broken away to reduce the length of the conduit section, and with the internal components illustrated in dashed lines.

FIG. 2 is a cross-sectional view of the coupling assembly, taken along lines 2—2 of FIG. 1.

FIG. 3 is an end view of one of the spacers of the conduit section.

FIG. 4 is a cross-sectional view of the first end of one conduit section and the second end of another conduit section, showing the coupling assembly of one section aligned with the end of the adjacent section.

FIG. 6 is a detailed illustration of the coupling assembly, illustrating how the flexible O-ring deforms so as to admit the protruding end of the adjacent conduit section as the conduit sections are coupled together.

DETAILED DESCRIPTION

Figure 5:
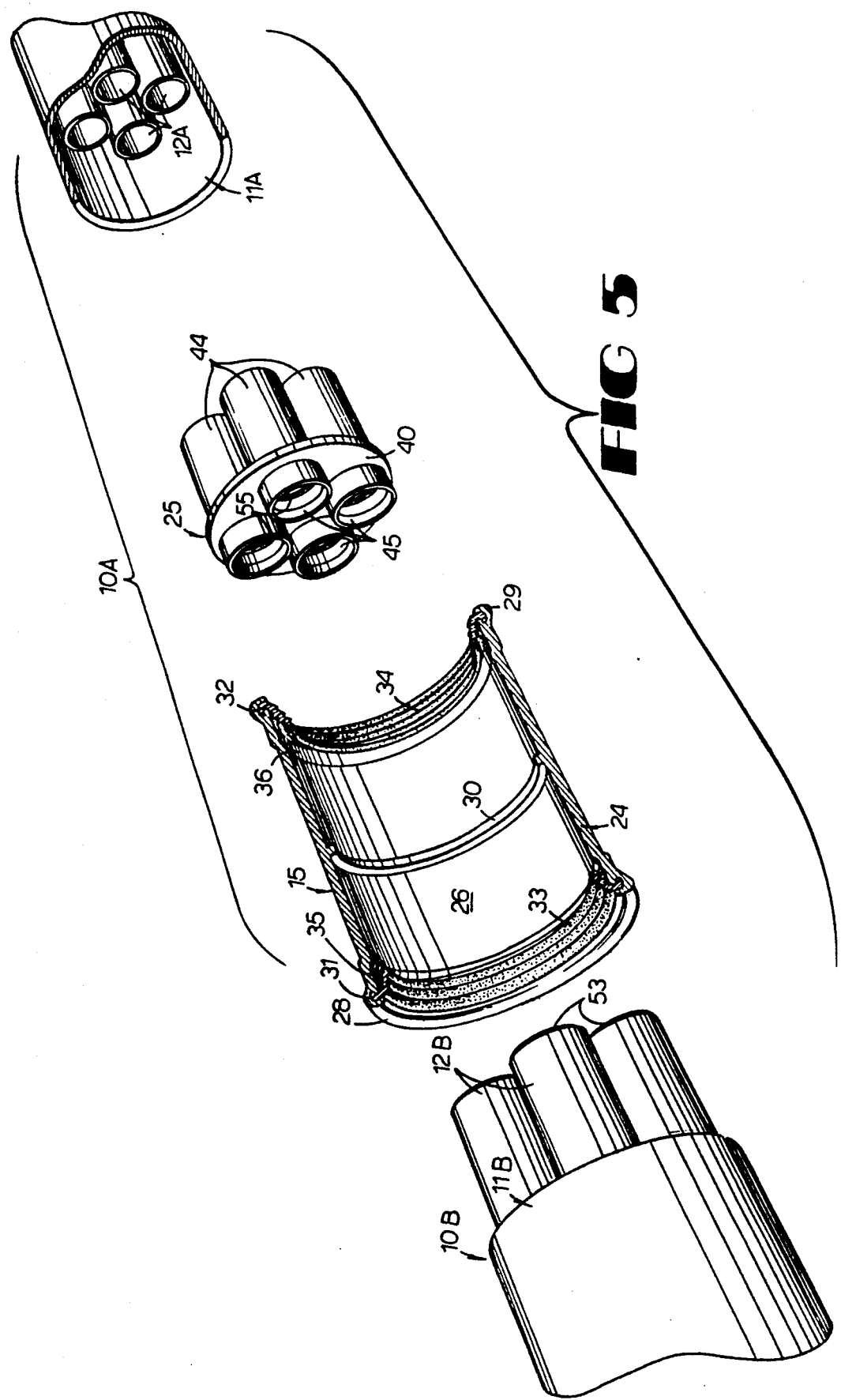
FIG. 5 is an exploded perspective illustration of the coupling assembly of one conduit section, also showing the other of the adjacent conduit section.

Referring now in more detail to the drawings, in which like numerals indicate like parts throughout the several views, FIG. 1 illustrates a single conduit section 10 which includes an outer, cylindrical elongated duct 11, a plurality of inner cylindrical elongated ducts 12, and a plurality of spacers 14 positioned inside the outer duct at intervals of approximately 4 feet along the length of the outer duct for holding the inner ducts in a predetermined, spaced, parallel relationship with respect to one another.

Coupling assembly 15 is located at one end 16 of the conduit section, while the second end 18 has no coupling assembly, but is formed with the inner ducts 12 protruding from the outer duct 11.

The configuration of spacers 14 is illustrated in more detail in FIG. 3. Each spacer 14 comprises a disc-shaped element having an outside diameter approximately equal to the inside diameter of outer duct 11, with slots 19 formed from the outer perimeter of the spacer and extending toward the central axis 20 of the spacer. The slots 19 each include a semi-circular portion 21 and opposed, straight sided portions 22. The semi-circular portions 21 are approximately the same diameter than the outside diameter of the inner ducts 12, with the straight sided portion 22 defining a space slightly smaller than the outside diameter of the ducts 12, whereby a duct can be forceably mounted in a slot 19 by pushing the duct radially inwardly of the slot until it is seated in the semi-circular portion 21. The spacers 14 are of conventional design and simply serve to locate the inner duct 12 at predetermined positions within the outer duct 11. Once the inner ducts have been mounted to a plurality of the spacers 14, the inner ducts and their spacers are then moved longitudinally into the outer duct 11.

Coupling assembly 15 is shown in more detail in FIGS. 4 and 5, and comprises an outer coupling 24 and inner coupling 25. Outer coupling 24 is approximately cylindrical and includes annular side wall 26 which is flared outwardly at its ends 28 and 29, and which includes an internally extending annular protrusion 30 intermediate its ends. Annular grooves 31 and 32 are formed internally at the ends of the outer coupling 24, and annular flexible gaskets 33 and 34 are seated in the annular grooves 31 and 32, respectively and protrude inwardly of the outer coupling. Recesses 35 and 36 are formed in the inner surface of outer coupling 24 adjacent grooves 31 and 32 for the purpose of accommodating the gaskets 34 and 35 when the gaskets have been deflected inwardly of the outer coupling 24.

Inner coupling 25 includes a support disc 40 that has an outside diameter approximately equal to the outside diameter of outer duct 11. A plurality of openings 41 (FIG. 2) are formed in support disc 40, and each opening 41 is sized and arranged so as to be large enough to surround an inner duct 12 and to be in alignment with an inner duct 12 when the conduit section has been assembled. A plurality of alignment sockets 44 are each mounted at one end thereof to support disc 40, each having its opening aligned with an opening 41 of support disc 40, and each being of a diameter sufficient to telescopically receive an inner duct 12 of a conduit section. Likewise, a plurality of guide sockets 45 are each mounted at one end thereof to support disc 40 in alignment with an opening of the support disc, with the guide sockets having an inside diameter of a size sufficient to telescopically receive an inner duct 12 of an adjacent conduit section. The alignment socket 44 and guide sockets 45, together with the openings 41, form a passageway through the inner coupling 25. Alignment sockets 44 each include an internally extending annular protrustion 48 having one surface 49 oriented perpendicular to the longitudinal axis 50 of the passageway formed by the aligned sockets 44 and 45, and an annular beveled opposed surface 51. An annular O-ring groove 54 is formed in each passageway of the inner coupling 25, with the grooves 54 being formed in a plane common to the support discs 40. The O-rings 55 are seated in the grooves 54, and protrude inwardly of the passageways formed by the sockets 44 and 45 and the openings formed through the support disc 40.

as best illustrated in FIG. 4, coupling assembly 15 is assembled by inserting the inner coupling 25 into the outer coupling 24 from the end 29 of the outer coupling until the outer perimeter portion of the support disc 40 of the inner coupling 25 abuts the internally extending annular protrusion 30 of outer coupling 24. The previously assembled outer duct 11 and inner ducts 12 are then plugged into coupling assembly 15. As illustrated in FIG. 4, outer duct 11A and its inner ducts 12A are telescopically inserted in coupling assembly 15, by passing outer duct 11A beyond the annular gasket 34 until the outer duct abuts the peripheral edge of the support disc 40. In the meantime, the inner ducts 12A move into the alignment sockets 44. The inner ducts 12A are moved into the alignment sockets 44 until they abut the surfaces 49 of the annular protrusions 48. This tends to align the inner ducts 12A in the coupling assembly 15.

In order to have the coupling assembly permanently attached to the outer and inner ducts 11A and 12A, adhesive is applied to the facing surfaces of the outer and inner ducts and the coupling assembly. The adhesive forms a pneumatic seal between the inner ducts 12A and the alignment sockets 44, and between the outer duct 11A and outer coupling 24.

As illustrated in FIGS. 1, 4 and 5, the other end of each conduit section 10 will have its inner ducts 12 protruding from the outer duct 11. For example, FIG. 4 illustrates the other end of an adjacent conduit section 10B, whereby the inner ducts 12B protrude from the outer duct 11B. When the end of the conduit section 10B is to be plugged into the coupling assembly 15 of the conduit section 10A, the conduit section 10B is rotated about its longitudinal axis until its inner ducts 12B are in alignment with guide sockets 45 of the inner coupling 25, and then the conduit sections are moved toward each other, with the conduit section 10B moving telescopically into coupling assembly 15. Inner ducts 12B move into guide sockets 45, then pass through O-rings 55 and finally abut the beveled surface 52 of the internally extending annular protrusion 48 of the alignment sockets 44. In the meantime, outer duct 11B moves into outer coupling 24, past flexible gasket 33, and then becomes seated in the space 51 inside outer duct 11 and outside the inner ducts 12, abutting the internally extending annular protrusion 30 (FIG. 6).

It will be noted that the protruding edges 53 of inner ducts 12B are beveled at an angle that corresponds to the bevel 51 of internally extending annular protrusion 48 of the alignment sockets 44. This tends to cause inner ducts 12 to accurately and firmly seat in inner coupling 25.

O-rings 55 are compressible, and when the inner ducts 12B move into the alignment sockets 45, the beveled end portions 53 of the inner ducts guide the inner ducts through the O-rings 55, compressing the O-rings outwardly to further seat them in their grooves 54. Once the beveled ends of the inner ducts 12B have moved on beyond guide sockets 45 and beyond the O-rings 55 and then move on into alignment sockets 44, the O-rings 55 form a seal around the outer surface of the inner ducts 12B. A seal is also formed between inner ducts 12A and inner coupling 25 by the adhesive 59 located at the innerface of the outer surfaces of the inner ducts 12A and alignment sockets 44 (FIG. 6). Therefore, a substantially impervious seal arrangement is formed between the aligned inner ducts 12A and 12B.

It should be understood that the embodiment of the invention disclosed herein merely illustrate principles of the invention in a preferred form. Other modifications, additions and deletions may be made thereto without departure from the scope of the invention as set forth in the following claims.

I claim:

1. In a multiple duct conduit system suitable for underground light guide cable installations including a plurality of similar elongated conduit sections for end-to-end connection to one another, with each section including an outer duct, a plurality of inner ducts positioned parallel to one another within the outer duct and with the inner ducts exposed in the outer duct at a first end of the conduit section, the improvement therein of:

a coupling assembly at the second end of each said conduit section, said coupling assembly comprising a substantially cylindrical outer coupling including an inner cylindrical wall surface permanently mounted about the outer duct of the conduit section and of a size to slip fit about the outer surface of the adjacent end of an outer duct of an abuting conduit section and including an internally projecting flange for locating the end surface of the outer duct of the abutting conduit section within said coupling assembly, an inner coupling positioned within said outer coupling and comprising an integral receptacle for receiving the inner ducts of the abutting conduit section including a plurality of open ended approximately cylindrical sockets mounted parallel to one another with each duct of the conduit section telescopically inserted into and adhesively connected to one end portion of a socket, the other end portion of each socket including an annular O-ring groove formed therein and a elastromeric O-ring seated in said O-ring groove, whereby the outer duct and the exposed inner ducts of the abutting conduit section can be plugged into the coupling assembly with the outer duct of the abutting conduit section telescopically received in the outer coupling and the exposed inner ducts of the abutting conduit section telescopically received in the sockets of the receptacle with each of the inner ducts of the abutting conduit section telescopically passing through an O-ring.

2. The multiple duct conduit system of claim 1 and wherein said inner coupling assembly comprises an outwardly projecting annular flange of a size to overlap said internally projecting flange of said outer coupling.

3. The multiple duct conduit system of claim 1 and wherein said inner coupling comprises a support plate having a circular peripherial edge of a diameter approximately equal to the outside diameter of the outer duct of the conduit section for engagement with said internally projecting flange of said outer coupling, and wherein said annular O-ring grooves of each socket are positioned in a plane common to the plane of the circular peripherial edge of said support plate.

4. The multiple duct conduit system of claim 3 and wherein each of said sockets includes an internally projecting flange each offset along the length of its socket from its O-ring away from the abutting conduit section, whereby the inner ducts of the abutting conduit section pass through the O-rings and engage the internally projecting flange of the socket.

5. In a multiple duct conduit system including a plurality of conduit sections each with a bundle of elongated inner ducts positioned in an outer duct and with the conduit sections connected in end-to-end abutment with one another, the improvement therein of each conduit section including at one end a coupling assembly including an outer coupling having telescopically received therein the adjacent end portion of the outer duct of its conduit section, and an inner coupling positioned inside said outer coupling having telescopically received therein the adjacent end portions of the inner ducts of its conduit section, said inner coupling comprising a receptacle including a support plate extending at a right angle to the lengths of said inner ducts and defining a plurality of openings therethrough each aligned with one of said inner ducts of its conduit section, a plurality of approximately cylindrical sockets mounted to opposite sides of said support plate, each of said sockets mounted at one of its ends to one surface of said support plate and surrounding one of the openings of said support plate so that sockets extend in opposite directions about each opening of said support plate and form a passageway with each opening, an annular groove formed in each passageway intermediate its ends, and an O-ring seated in each annular groove, and an annular inwardly extending protrusion in each passageway offset along the length of its passageway from its O-ring away from the adjacent conduit section, the inner ducts of the conduit section being telescopically received in the sockets on the side of the support plate facing into the conduit section and the end portions of said inner ducts juxtaposed the annular inwardly extending protrusions of their passageways, whereby the end portions of the inner ducts of the adjacent conduit section can be moved through the passageways of the support plate beyond the O-rings until they abut the protrusion of the passageway, with the O-rings forming a seal about the inner ducts.

6. In a multiple duct conduit system suitable for receiving light guide cable installations or the like including a plurality of similar elongated conduit sections for end-to-end connection to one another, with each section including an outer duct and a plurality of inner ducts positioned parallel to one another within the outer duct, the improvement therein of;

a coupling assembly for connecting the ends of adjacent conduit sections, said coupling assembly comprising a one piece inner coupling having end portions sized and shaped to be telescopically received in adjacent end portions of said outer ducts, including an outwardly extending annular flange positioned intermediate its end portions for placement between adjacent ends of said conduit sections, and comprising a receptacle for receiving the ends of each of the inner ducts of the abutting conduit sections, said inner coupling including a plurality of open ended approximately cylindrical sockets extending parallel to one another and along the lengths of the adjacent conduit sections, with the inner ducts of the conduit sections telescopically inserted into opposite ends of each socket, an annular seal member positioned between the surfaces of at least one of said sockets of said inner coupling and the inner duct received in the socket, whereby the outwardly extending annular flange of said inner coupling locates the inner coupling at adjacent end portions of the outer ducts and the inner ducts of the abutting conduit sections are plugged into opposite ends of the sockets of the inner coupling with the inner ducts being telescopically received in the sockets of the inner coupling with at least some of the inner ducts of the abutting conduit sections telescopically passing through a seal member of the inner coupling.

7. The multiple duct conduit system of claim 6 and wherein said coupling assembly includes a substantially cylindrical outer coupling mounted to an end of the outer duct of one of said conduit sections, said outer coupling being of a diameter sufficient to telescopically receive the outer duct of the adjacent conduit section and including an internally extending annular protrusion of a diameter small enough to engage said annular flange of said inner coupling.

8. The multiple duct conduit system of claim 7 and wherein each of said sockets includes an internally projecting flange offset along the length of its socket from its seal member, and wherein said annular seal members each comprise an annular O-ring groove and an O-ring seated in each O-ring groove, whereby the inner ducts of a conduit section pass through the seals and engage the internally projecting flanges of the sockets.

9. In a multiple duct conduit system suitable for receiving light guide cables or the like including a plurality of conduit sections each with a bundle of elongated inner ducts positioned in an outer duct and with the conduit sections connected in end-to-end abutment with one another, the improvement therein of a coupling assembly for connecting the ends of adjacent conduit sections, said coupling assembly comprising;

an inner coupling positioned inside adjacent end portions of said outer ducts and including a receptacle with a support plate extending at a right angle to the lengths of said inner ducts and defining a plurality of openings therethrough, each opening aligned with one of said inner ducts of its conduit section;

a plurality of approximately cylindrical sockets mounted to opposite sides of said support plate, each of said sockets mounted at one of its ends to one surface of said support plate and surrounding one of the openings of said support plate so that sockets extend in opposite directions about each opening of said support plate and form a passageway with each opening, an annular groove formed in each passageway intermediate its ends, and an O-ring seated in each annular groove, and an annular inwardly extending protrusion in each passageway offset along the length of its passageway from its O-ring away from the adjacent conduit section, the inner conduits of the conduit section being telescopically received in the sockets on the side of the support plate facing into the conduit section and the end portions of said inner ducts juxtaposed the annular inwardly extending protrusions of their passageways, whereby the end portions of the inner ducts of the adjacent conduit section can be moved through the passageways of the support plate beyond the O-rings until they abut the protrusion of the passageway, with the O-rings forming a seal about the inner ducts.

10. In a multiple duct conduit system suitable for underground light guide cable installations and the like including a plurality of similar elongated conduit sections arranged in end-to-end connection to one another, with each conduit section including an outer duct, a plurality of inner ducts positioned parallel to one another within the outer duct and with the inner ducts protruding from the outer duct at a first end of the outer duct, the improvement therein of:

a coupling assembly at the second end of each of said conduit sections connecting its conduit section in end-to-end relationship with the first end of an adjacent conduit section, said coupling assembly comprising a substantially cylindrical outer coupling including a cylindrical wall permanently mounted to the outer duct of the conduit section and of a size to slip fit about the outer surface of the first end of an adjacent outer duct of an adjacent conduit section and including an internally projecting flange for locating the end surface of the outer duct of the adjacent conduit section within said coupling assembly, an inner coupling of one piece integral construction having opposed end portions each telescopically received in the adjacent ends of adjacent outer ducts and defining a plurality of open ended approximately cylindrical sockets extending parallel to one another with each inner duct of the second end of the conduit section telescopically inserted into one end portion of a socket, an annular seal means mounted in the surface of each socket of said inner coupling for receiving and sealing against the protruding ends of the inner ducts of the adjacent conduit section, whereby the outer duct and the protruding inner ducts of the adjacent conduit section can be plugged into the coupling assembly with the outer duct of the adjacent conduit section telescopically received in the outer coupling and the protruding ends of the inner ducts of the adjacent conduit section telescopically received in the sockets of the inner coupling with each of the inner ducts of the adjacent conduit section telescopically passing through an annular seal means.

11. The multiple duct conduit system of claim 10 and wherein said inner coupling assembly comprises an outwardly projecting annular flange of a size to overlap said internally projecting flange of said outer coupling.

12. The multiple duct conduit system of claim 10 and wherein said inner coupling comprises a support plate having a circular peripheral edge of a diameter approximately equal to the outside diameter of the outer duct of the conduit section for engagement with said internally projecting flange of said outer coupling, and wherein said annular seal means of each socket is positioned in a plane common to the plane of the circular peripheral edge of said support plate.

13. The multiple duct conduit system of claim 10 and wherein each of said sockets includes an internally projecting flange with each flange offset along the length of its socket from its annular seal means away from the abutting conduit section, whereby the inner ducts of the abutting conduit section pass through the annular seal means and engage the internally projecting flange of the socket.

14. A coupling for joining the ends of adjacent longitudinally aligned duplicate conduit sections in end-to-end relationship, each conduit section comprising an outer duct and a plurality of inner ducts disposed in an extending along the length of the outer duct, with the conduit sections placed in sealed end-to-end telescopically connected relationship to form a multiple duct conduit system having inner ducts of substantially constant diameter inner surfaces for receiving fiber optic communication cable, said coupling having opposed end portions each of a breadth suitable for insertion into the adjacent ends of said outer ducts, and an externally protruding projection between said opposed end portions of a breadth approximately equal to the outside diameter of the outer ducts for placement between the adjacent end portions of said outer ducts for holding the coupling in position at the ends of the adjacent outer ducts, said coupling including a plurality of passageways extending therethrough, each of said passageways being of a diameter and shape to telescopically receive in its opposite ends an end of an inner duct of the adjacent conduit sections, an annular seal means positioned in each passageway of said coupling for surrounding an inner duct that is telescopically received in the passageway and providing seals between the passageways of said coupling and the inner ducts extending into the passageways of the inner coupling, and an internally extending protrusion positioned in each passageway and axially displaced form said seal means for engagement by the ends of the inner ducts for restricting longitudinal movement of the inner ducts through the passageways.

15. The coupling of claim 14 and further comprising spacer members positioned in the outer ducts and receiving the inner ducts and locating the inner ducts at predetermined positions within the outer ducts.

* * * * *